(12) United States Patent
Hagenstad

(10) Patent No.: US 9,451,061 B2
(45) Date of Patent: Sep. 20, 2016

(54) CELL PHONE PERSONAL SAFETY ALARM

(71) Applicant: Erik N. Hagenstad, Santa Rosa, CA (US)

(72) Inventor: Erik N. Hagenstad, Santa Rosa, CA (US)

( * ) Notice: Subject to any disclaimer, the term of this patent is extended or adjusted under 35 U.S.C. 154(b) by 199 days.

(21) Appl. No.: 13/851,048

(22) Filed: Mar. 26, 2013

(65) Prior Publication Data

US 2013/0260825 A1    Oct. 3, 2013

Related U.S. Application Data

(60) Provisional application No. 61/617,521, filed on Mar. 29, 2012.

(51) Int. Cl.
*H04M 1/00* (2006.01)
*H04M 1/02* (2006.01)
*H04M 1/725* (2006.01)
*G08B 25/01* (2006.01)
*G08B 15/00* (2006.01)

(52) U.S. Cl.
CPC .......... *H04M 1/0202* (2013.01); *G08B 15/004* (2013.01); *G08B 25/016* (2013.01); *H04M 1/72541* (2013.01); *H04M 2250/10* (2013.01)

(58) Field of Classification Search
CPC ..... H04W 4/22; H04W 76/007; H04W 4/12; H04W 52/0261; H04W 52/0296; H04W 88/181; H04W 48/16; H04W 4/02; H04W 4/006; H04W 84/18; H04W 88/02; H04W 24/00; H04W 40/00; H04W 4/008; H04W 4/046; H04W 64/00; H04W 76/02; H04W 84/04; H02M 2242/30; H02M 11/04; H02M 3/493; H02M 1/72538; H02M 1/72519; H02M 1/72522; H02M 2250/10; H02M 7/1245; H02M 1/274575

USPC ........... 340/425.5, 426.18, 436, 5.72, 539.1, 340/539.13, 540, 521, 531, 501; 370/278, 370/338, 352, 493, 522; 455/404.1, 404.2, 455/414.1, 564, 456.3, 556.1, 550.1, 557
See application file for complete search history.

(56) References Cited

U.S. PATENT DOCUMENTS

| | | | |
|---|---|---|---|
| 6,044,257 A * | 3/2000 | Boling et al. ............... | 455/404.2 |
| 6,226,510 B1 * | 5/2001 | Boling .................... | G08B 7/064 340/574 |
| 6,493,338 B1 * | 12/2002 | Preston et al. ................ | 370/352 |
| 6,636,732 B1 | 10/2003 | Boling et al. | |
| 7,321,781 B2 | 1/2008 | Sorotzkin | |
| 7,355,507 B2 | 4/2008 | Binning | |
| 7,750,799 B2 | 7/2010 | Childress et al. | |
| 2003/0100332 A1* | 5/2003 | Engstrom ............... | H04M 1/22 455/550.1 |
| 2004/0203842 A1* | 10/2004 | Hanninen et al. ......... | 455/456.1 |

(Continued)

*Primary Examiner* — Golam Sorowar
(74) *Attorney, Agent, or Firm* — Gulf Coast Intellectual Property Group

(57) ABSTRACT

The cell phone personal safety alarm is a cell phone having a panic alarm button on the back of the phone that activates the alarm when pressed. An alarm shield prevents accidental push of the button and is flipped open to expose the button. Activating the alarm causes a loud alarm tone or siren to sound and red and blue lights or other visual alarm displays to flash. Front and rear cameras transmit live video to an online secure database, where it is recorded to preserve evidence. Front and rear lights may be included for night or low-light level video. An e-911 call is made to notify law enforcement and provide the location of the emergency via the phone's integral global positing system (GPS). In another embodiment, the device is a retrofitting case for existing cell phones that would be able to achieve the same results.

5 Claims, 6 Drawing Sheets

(56) References Cited

U.S. PATENT DOCUMENTS

| | | |
|---|---|---|
| 2006/0079269 A1* | 4/2006 | Sorotzkin ............ H04M 1/0214 455/550.1 |
| 2008/0102785 A1 | 5/2008 | Childress et al. |
| 2008/0211677 A1 | 9/2008 | Shecter |
| 2010/0156626 A1 | 6/2010 | Story |
| 2011/0281550 A1* | 11/2011 | Peabody .................... 455/404.2 |
| 2012/0178410 A1* | 7/2012 | Singhal ..................... 455/404.2 |

* cited by examiner

CELL PHONE PERSONAL SAFETY ALARM

CROSS-REFERENCE TO RELATED APPLICATION

This application claims the benefit of U.S. Provisional Patent Application Ser. No. 61/617,521, filed Mar. 29, 2012.

BACKGROUND OF THE INVENTION

1. Field of the Invention

The present invention relates to panic alarms, and particularly to a cell phone personal safety alarm that produces an audible alarm, establishes radio communication with a 911 emergency response center, provides the emergency response center with the location of the cell phone, and transmits a video stream of the emergency situation.

2. Description of the Related Art

Emergency response numbers, such as 911, are utilized to provide individuals with a quick and easy way to contact an emergency response center when an emergency situation arises. By providing a standardized method of contacting emergency personnel, these emergency response numbers are effective in reducing the amount of time necessary to respond to an emergency. In an emergency, the amount of time required to respond can often mean the difference between life and death.

Response time may be further minimized by employing caller identification technology that allows the operator of the emergency response center to automatically determine the phone number of the caller without requiring the caller to provide such information. If the call was placed from a stationary telephone, the operator at the emergency response center can also determine the location of the caller. Thus, even if the user is unable to verbally request assistance, the emergency response center can still send emergency response personnel to the location from which the call was placed.

However, if the emergency situation occurs in a remote area, it is often impossible to place a call from a stationary telephone at a fixed location to the emergency response system. With the advent of cellular telephone technology, it is now possible to carry a cellular telephone that allows an emergency caller to contact an emergency response center from practically anywhere. The primary drawbacks of the cellular system are the high cost of cellular service and the inability of the emergency response center to automatically determine the location of the caller.

Drawbacks of cell phone emergency use include multiple buttons and functions, which may cause confusion in an emergency situation. Because of the stress often associated with emergency situations, an operator of, e.g., a Smartphone, may fail to properly summon emergency personnel. In addition, these emergency communication devices fail to integrate the functioning of the cellular device with a home alarm system that the user of the device might have. Furthermore, the devices do not have the capability to summon individuals in the immediate area around the device that may be able to provide assistance.

Thus, a cell phone personal safety alarm solving the aforementioned problems is desired.

SUMMARY OF THE INVENTION

The cell phone personal safety alarm includes a panic alarm button on the back of a cell phone that activates a panic messaging alarm when pressed. An alarm shield prevents accidental push of the button, and is flipped open to expose the button when needed. Activating the alarm causes a loud alarm tone or siren to sound and red and blue lights or other visual alarm displays to flash. Front and rear cameras transmit live video to an online secure database, where it is recorded to preserve evidence. Front and rear lights may be included for night or low-light level video. When the panic button is pushed, an enhanced 911 (e-911) call is made to notify law enforcement and provide the location of the emergency via the phone's integrated or internal global positing system (GPS) receiver. In another embodiment, the device is a retrofitting case for existing cell phones that would be able to achieve the same results.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present cell phone personal safety alarm can comprise software or firmware code executing on a computer, a microcontroller, a microprocessor, or a DSP processor; state machines implemented in application specific or programmable logic; or numerous other forms without departing from the spirit and scope of the method described herein. Methods employed by the present cell phone personal safety alarm can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 1:
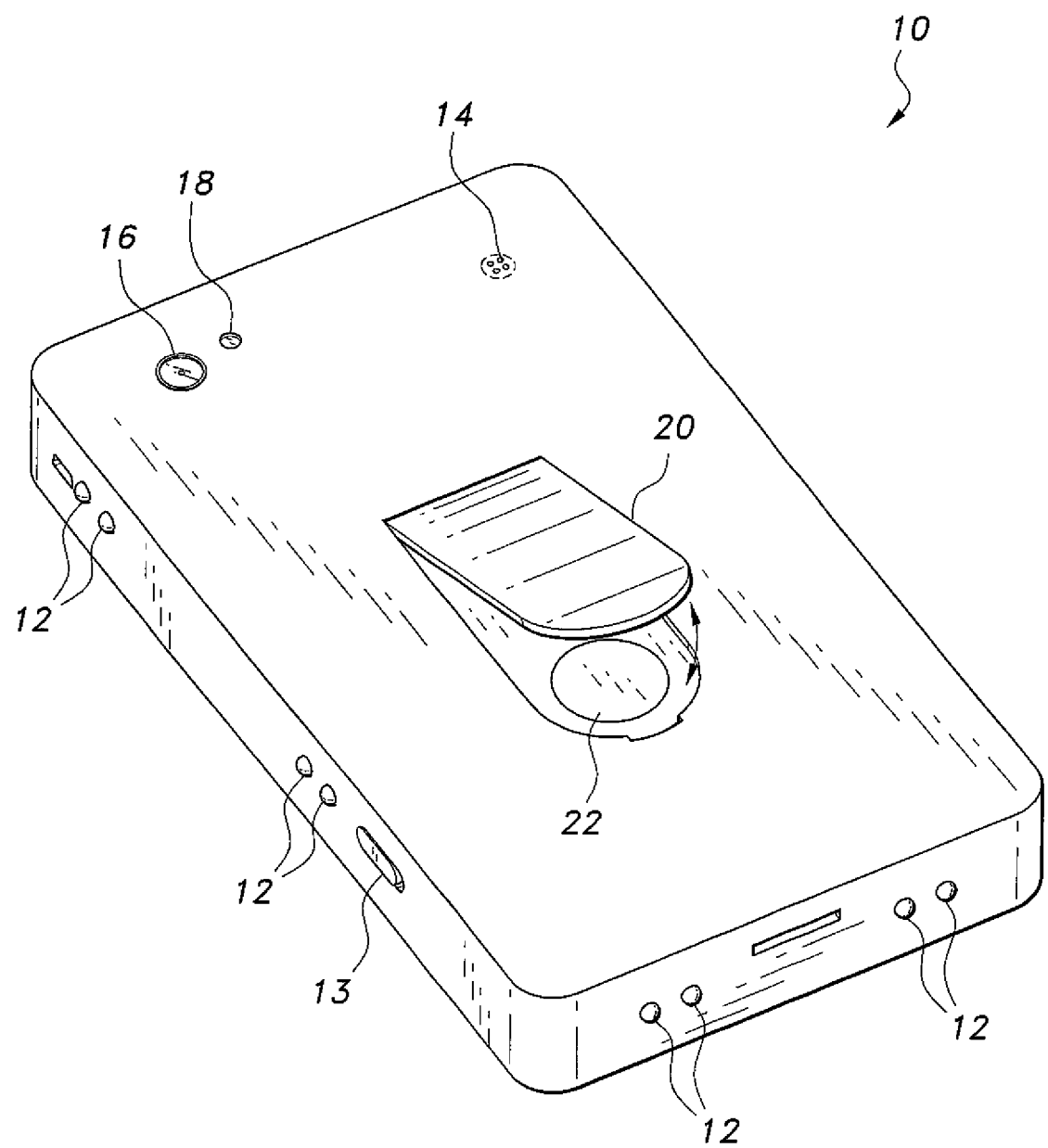
FIG. 1 is a perspective view of a first embodiment of a cell phone personal safety alarm according to the present invention, in which the alarm is built into the phone, as seen from the rear of the phone.
Figure 2:
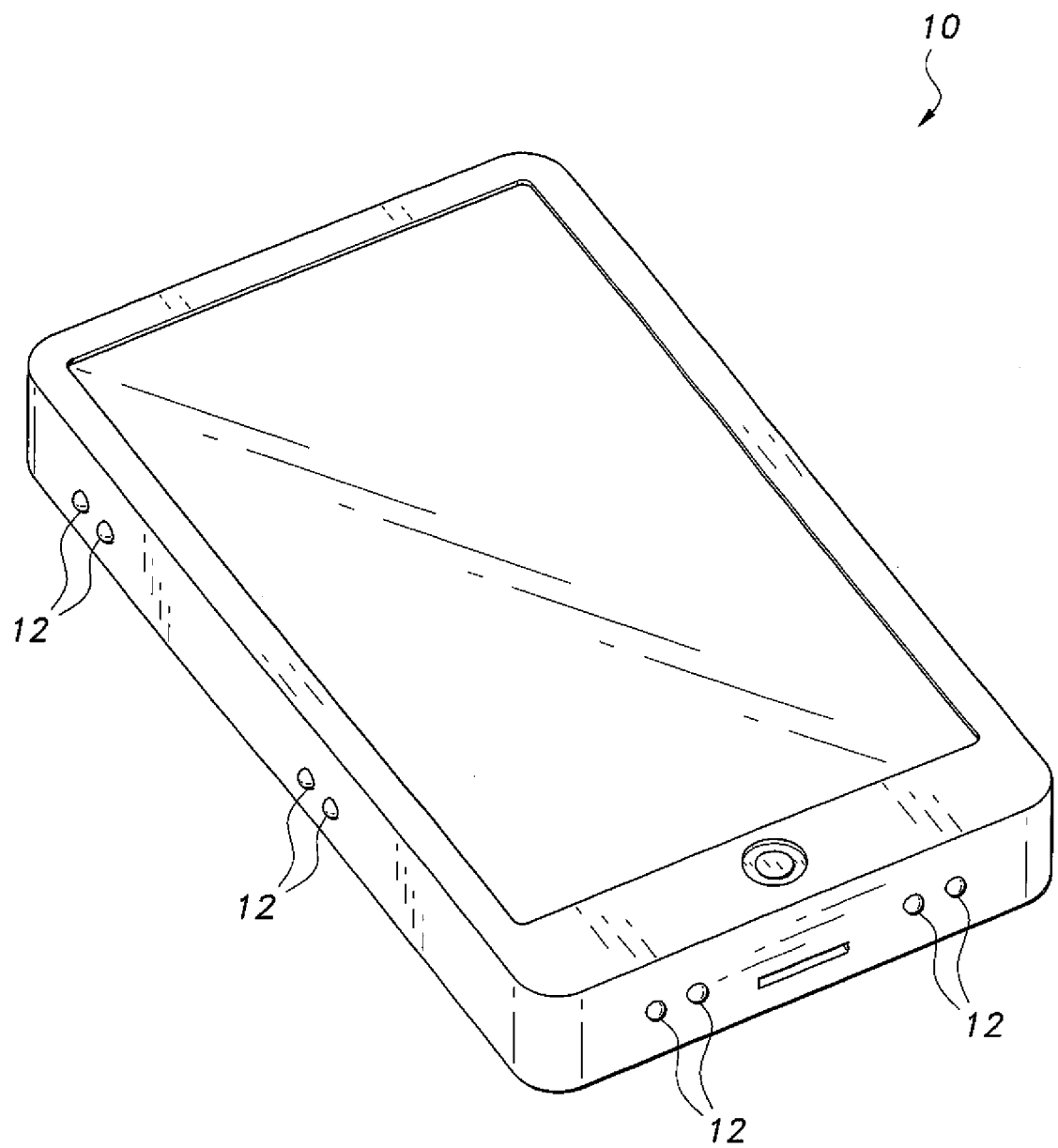
FIG. 2 is a perspective view of the phone of FIG. 1 as seen from the front and bottom end of the phone.
Figure 3:
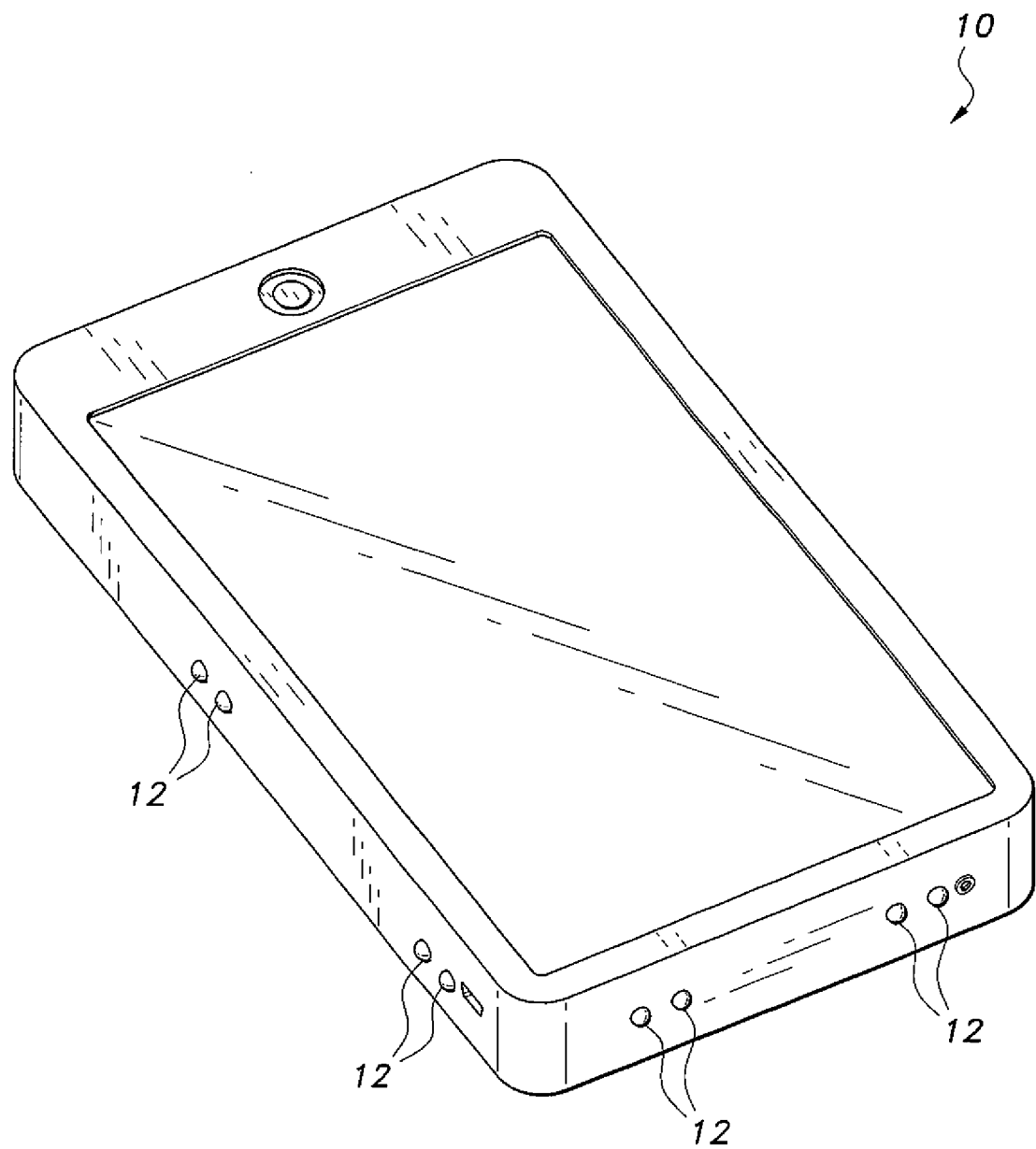
FIG. 3 is a perspective view of the phone of FIG. 1 as seen from the front and top end of the phone.

As shown in FIGS. 1-3, in a first embodiment, the cell phone personal safety alarm is a cell phone 10 that includes a panic alarm button 22 on the rear or back of the phone 10, the panic alarm button 22 activating a variety of alarms when pressed. A U-shaped alarm shield 20 pivotally attached to the phone 10 by a hinge (which may be a living hinge) locks in a closed position over the panic button 22 to prevent accidental push of the button 22. A user's finger or nail can slip under a detent or recess proximate the arcuate end portion of the shield 20 to flip the cover or shield 20 open to expose the button 22. The shield may be configured as a switch that activates a loud alarm tone or siren which sounds via speaker 14 disposed on the body of the cell phone. A push of the button 22 silences the alarm tone or siren (to preserve audio evidence) and causes the video that has been recording internally since the warning lights were started to be streamed on-line to a secure data base. Moreover, the push of the button 22 activates an auto-dial call to e-911 (enhanced 911) to notify law enforcement and provide the location of the emergency via the phone's integral or internal global positing system (GPS) receiver. Red and blue flashing lights 12 disposed on peripheral edges of the cell phone body are activated to flash when the alarm button 22 is pressed.

Alternatively switch sequencing may be configured such that a push of the button 22 activates the alarm and causes the loud alarm tone or siren to sound via a speaker 14 disposed on the body of the cell phone. The switch sequencing and emergency button location described herein is exemplary and it is contemplated that the switch sequencing and/or emergency button location on the phone may be modified without deviating from the scope of the present invention.

Independent of the alarm button 22, a switch 13 is disposed on the side of the phone and is wired to activate the flashing red and blue lights 12 to ward off a potential attacker, while at the same time activating at least one camera 16 disposed on the cell phone body for video recording to the cell phone internal memory. Alternatively, the camera 16 may be activated by pressing the switch 13, which causes the camera 16 to transmit live video to an online secure database coordinated by a remote server where the video stream is recorded to preserve evidence. Audio may be captured by the phone's microphone and streamed to the remote server as well. Preferably, there can be a camera 16 installed on both the front and back portion of the cell phone 10. At least one light 18 is disposed on the cell phone body and is included for night or low-light level video.

Figure 4:
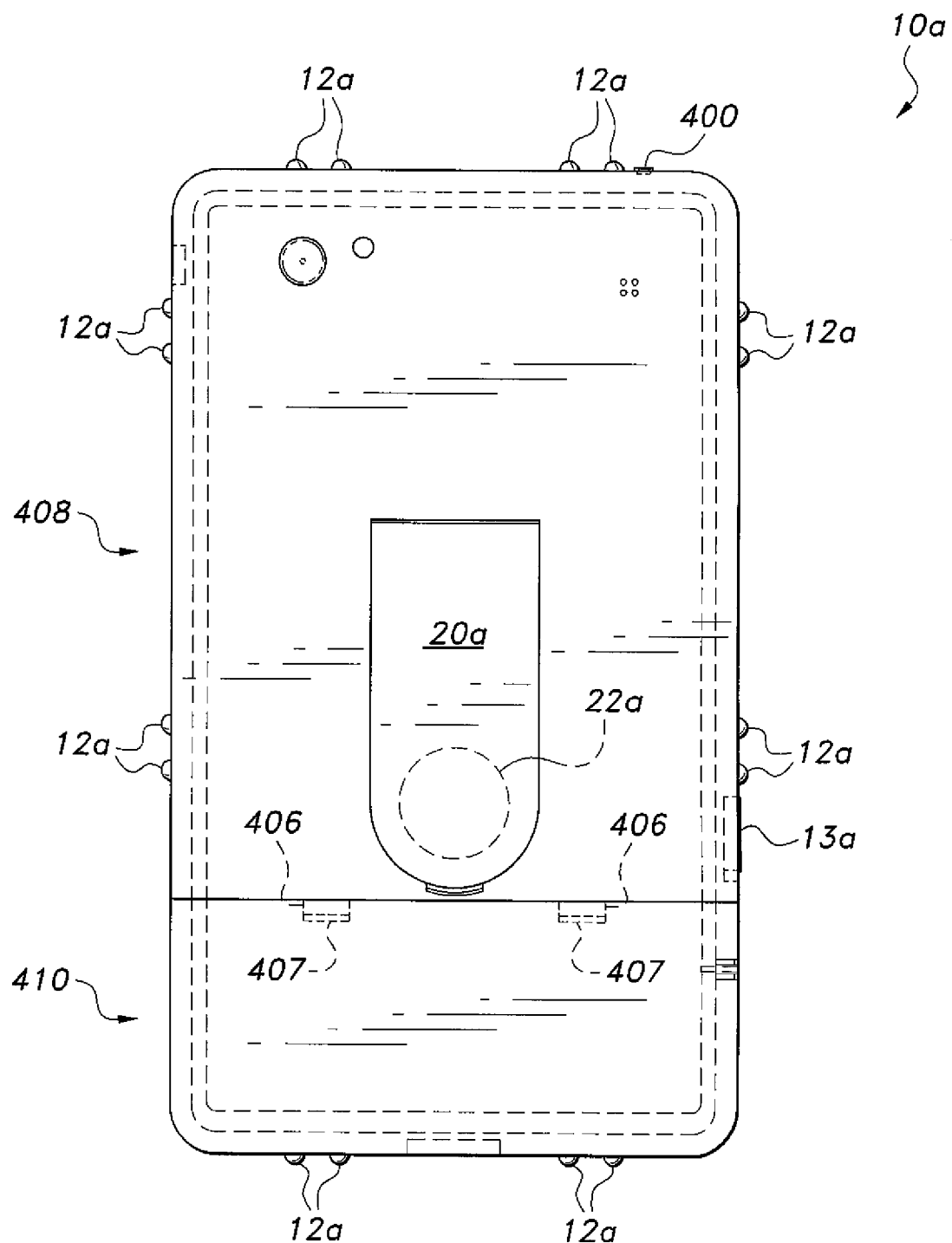
FIG. 4 is a rear view of a second embodiment of a cell phone personal safety alarm according to the present invention, in which the alarm is built into a case for a cell phone.
Figure 5:
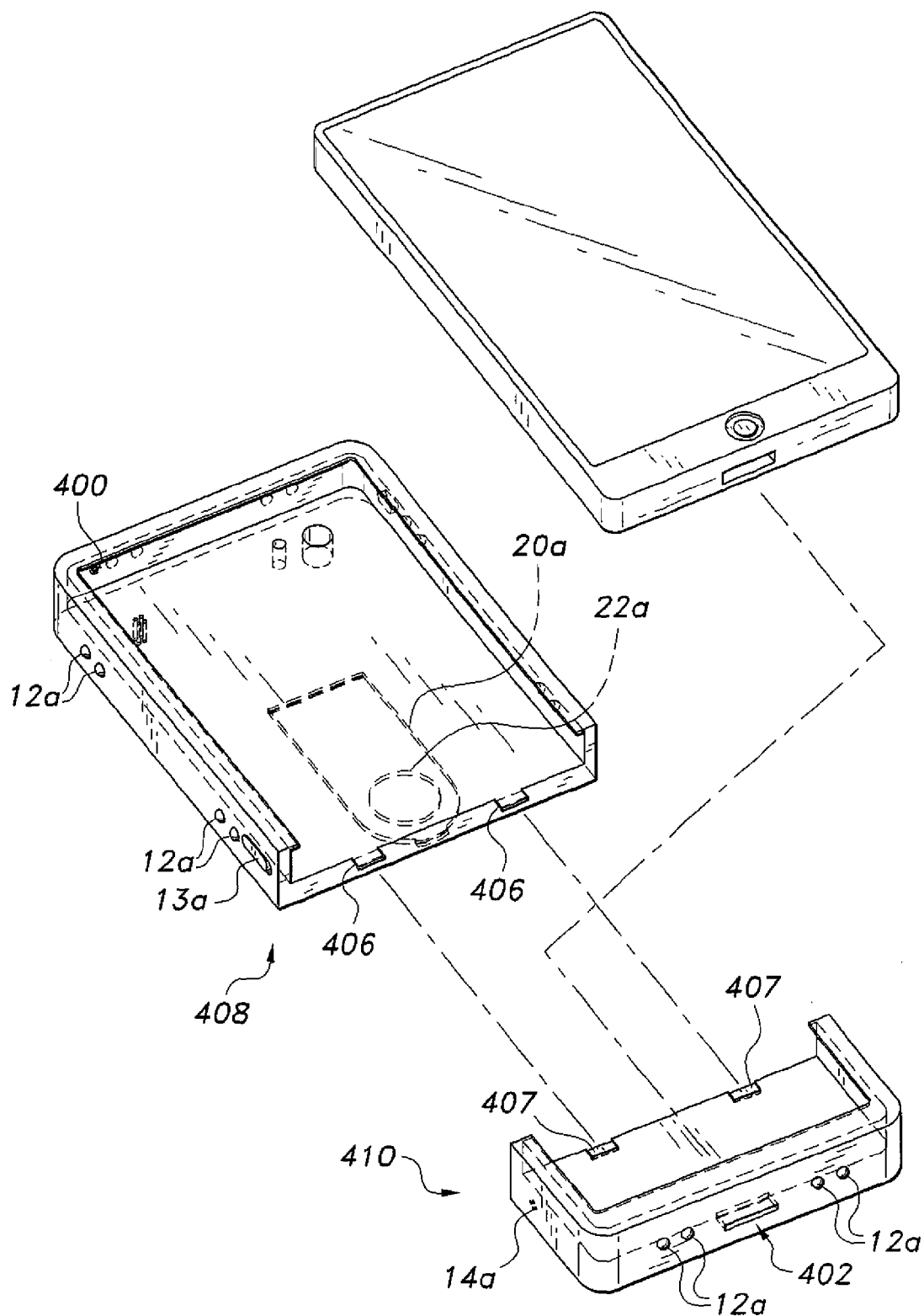
FIG. 5 is a perspective view showing the phone case of FIG. 4 exploded from the cell phone.

In another embodiment, shown in FIGS. 4 and 5, the device is a retrofitting case for existing cell phones to provide the same functionality described above. The retrofitting case includes an upper shell 408 and a lower shell 410 that lock together to retain the retrofitted phone in the case. Electronic circuit(s) required to perform the alarm functions is/are disposed inside the shell components 408 and 410. The top portion of the upper shell 408 has red and blue flashing lights 12a, as well as a 3.5 mm receptacle 400 for interface commands to the attached phone. The receptacle 400 accepts a connection from the attached phone. Panic audible alarms may be routed via this command to the speaker built into the attached phone. Alternatively, the shell portion 410 may have a built in speaker 14a.

The side portions of the upper shell 408 also include flashing red and blue lights 12a. The bottom portion of the lower shell 410 includes the red and blue flashing lights 12a. Also disposed on the bottom of the lower shell 410 is a charger port 402 to allow the encased phone access to a charger plug. A light switch 13a is included on one of the sides of the upper shell 408 and controls all of the flashing red and blue lights 12a on the device.

The rear portion of upper shell includes a U-shaped alarm shield 20a pivotally attached to the case that locks in a closed position over the panic button 22a to prevent an accidental push of the button 22a. The lower portion of the back or rear of the upper shell 408 includes a detent or recess proximate an arcuate end portion of the shield 20a. A user's finger or nail can slip under the cover or shield 20a to flip it open and expose the button 22a.

As most clearly shown in FIG. 5, the cell phone to be retrofitted is placed in one of the shells, and the shells 408 and 410 are then locked together utilizing rectangular tabs 406 on the inside bottom edge of upper shell 408, which align with and lock into slots 407 disposed on inside upper edge of the lower shell 410 to securely hold the cell phone in the shell retrofit case.

When the phone is electrically connected to the alarm case via the 3.5 mm connector 400, alarm functionally in the unit is activated. A push of the button 22a activates the alarm and causes a loud alarm tone or siren to sound via the speaker 14a disposed on the lower shell 410. Moreover, the push of the button 22a activates an auto-dial call to e-911 to notify law enforcement and provide the location of the emergency via the phone's integral global positing system (GPS) receiver. Red and blue flashing lights 12a disposed on the peripheral edges of the shells 408 and 410 are activated to flash when the button 22a is pressed.

Independent of the alarm button 22a, a switch 13a is disposed on the side of the upper shell 408 and is wired to activate the flashing red and blue lights 12a to ward off a potential attacker. The cell phone's own camera is activated by pressing the alarm button 22a, which causes the cell phone camera to photograph through a transparent window or a hole in the upper shell 408 and transmit live video to an online secure database, where it is recorded to preserve evidence.

Figure 6:
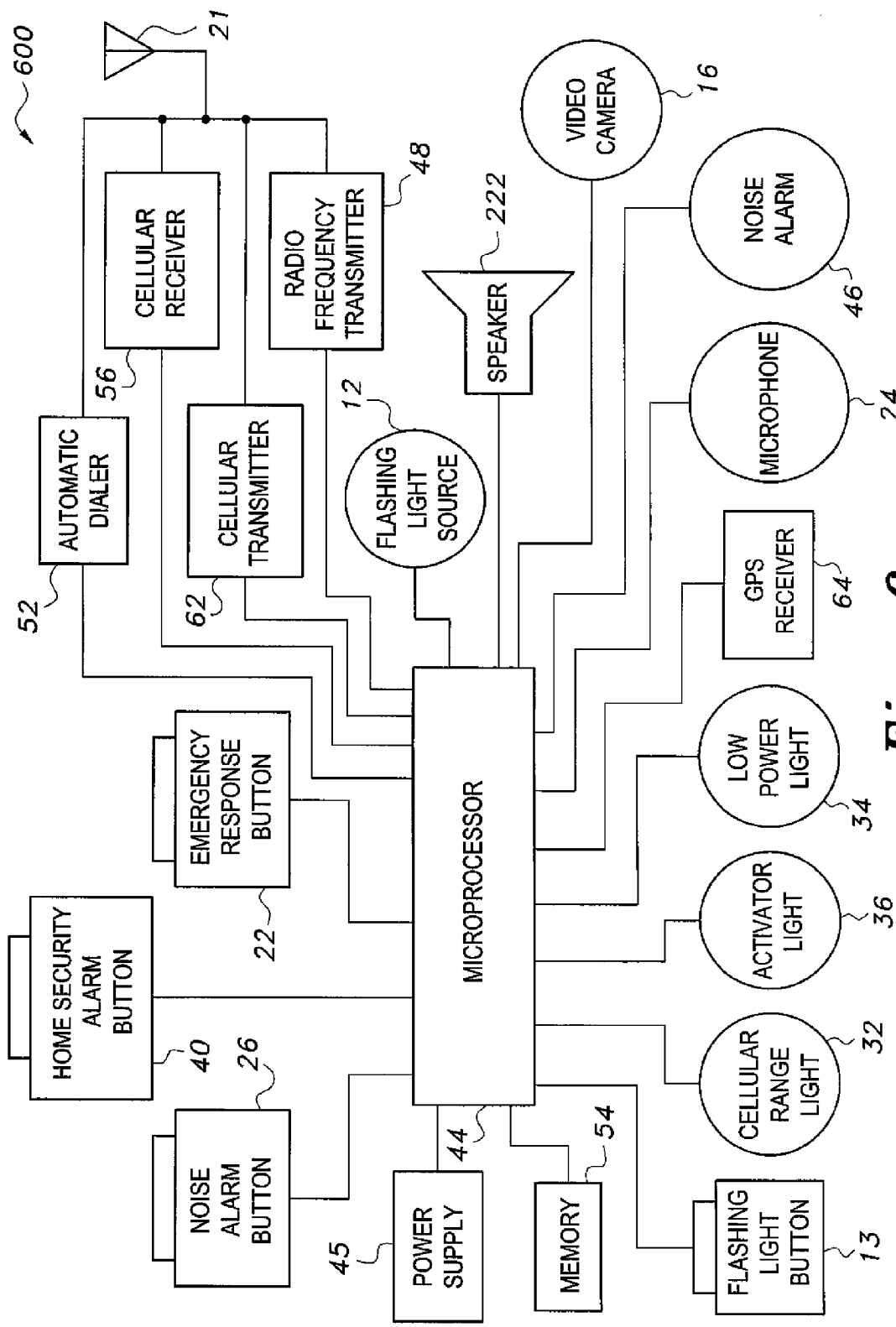
FIG. 6 is a block diagram of a cell phone personal safety alarm according to the present invention.

An exemplary electronic circuit that could perform the aforementioned functions is shown in FIG. 6, and draws from the disclosure in U.S. Pat. No. 6,636,732, issued to Boling, et al., which is hereby incorporated by reference in its entirety. As most clearly shown in FIG. 6, a cell phone or phone case has a microprocessor 44 that coordinates user interfaces, cell phone functions, and emergency alarm functions. Power to the unit is supplied by a power supply (or battery) 45. The unit may have memory 54 connected to the microprocessor 44. An emergency response control program responsible for coordinating emergency button presses with alarm actuation, video streaming actuation, e-911 autodialing, and GPS coordinate transmission may reside in the memory 54 for execution by the microprocessor 44. The red and blue flashing light control button (13 for the integrated unit, 13a for the retrofit unit) is connected to the microprocessor 44. There may also be a noise alarm button 26 connected to the microprocessor 44. The emergency response button 22 is connected to the microprocessor 44. A home security alarm button 40 may be connected to the microprocessor. Moreover, a cell phone typically has a cellular range light 32, an activator light 36, a low power light 34, a GPS receiver 64, a microphone 24, a speaker 222, a cellular transmitter 62 a cellular receiver 56, and an automatic dialer 52, all coordinated and controlled by the microprocessor 44. An out-of-band radio frequency transmitter 48 may also be employed for auxiliary emergency communications. The transmitters and receivers are connected to an antenna 21.

The red and blue flashing lights 12 (or 12a) are actuated by a control signal from the microprocessor 44 via their connection to the microprocessor 44. The noise alarm 46 is connected to the microprocessor 44 and may route the alarm to a speaker 222, shown in FIG. 6, or to the speaker arrangement 14, 14a, shown in FIGS. 1 and 5, respectively.

It is to be understood that the present invention is not limited to the embodiments described above, but encompasses any and all embodiments within the scope of the following claims.

I claim:

1. A cell phone personal safety alarm comprising:
a two-part shell case, the two-part shell case having a first portion and a second portion, the two-part shell case having a bottom integrally formed with four side walls extending upward therefrom to create an interior volume, the two-part shell case further including an opening operable to provide access to a cell phone secured within the two-part case, said first portion and said second portion configurable to longitudinally couple together so as to facilitate surroundable mounting of a cell phone, said bottom having an inner surface and an exterior surface, said interior surface adjacent the interior volume;
an emergency alert button disposed on said exterior surface of said bottom of the two-part shell case;
an emergency alert button guard disposed proximate the emergency alert button, the emergency alert button guard having a first end and a second end, the emergency alert button guard being hingedly secured to the exterior surface of said bottom, said emergency alert button guard having a first position and a second position;
flashing lights disposed on the four sidewalls of the case opposite the interior volume;
a switch disposed on one of the four side walls, the switch activating the flashing lights;
a port connection on the case adapted for connecting the two-part case to a cell phone disposed within the interior volume, the cell phone having a GPS receiver, a camera, a microphone, an autodialer and a speaker; and
wherein the emergency alert button guard activates an audio alarm on the speaker of the cell phone subsequent the emergency alert button guard being moved to said second position.

2. The cell phone personal safety alarm according to claim 1, wherein the first portion of the two-part shell case includes a perimeter edge that includes two slots formed therein.

3. The cell phone personal safety alarm according to claim 1, wherein the second portion of the two-part shell case includes a perimeter edge that includes two tabs formed therein that are operable to journal into said two slots when said first portion and said second portion are operably coupled together.

4. The cell phone personal safety alarm according to claim 3, wherein the flashing lights disposed on the four sidewalls are organized in pairs and are operable to display a first color and a second color.

5. The cell phone personal safety alarm according to claim 1, wherein the second end of the emergency alert guard button shield includes a rounded perimeter edge.

* * * * *